United States Patent [19]

Schwartz

[11] 4,405,010

[45] Sep. 20, 1983

[54] SENSIBLE HEAT STORAGE UNIT

[75] Inventor: Jacob Schwartz, Arlington, Mass.

[73] Assignee: Sanders Associates, Inc., Nashua, N.H.

[21] Appl. No.: 157,930

[22] Filed: Jun. 9, 1980

Related U.S. Application Data

[63] Continuation of Ser. No. 918,889, Jun. 28, 1978, abandoned.

[51] Int. Cl.³ .............................................. F28D 17/00
[52] U.S. Cl. ............................................ 165/4; 165/10
[58] Field of Search ......................................... 165/4, 10

[56] References Cited

U.S. PATENT DOCUMENTS

| | | | |
|---|---|---|---|
| 655,274 | 8/1900 | Ramsden | 165/10 X |
| 2,492,788 | 12/1949 | Dennis | 165/4 |
| 2,616,668 | 11/1952 | Van Weenen et al. | 165/10 |
| 2,706,109 | 4/1955 | Odman | 165/10 X |
| 3,112,184 | 11/1963 | Hollenbach | 165/10 X |
| 3,203,472 | 8/1965 | Brandt | 165/10 |
| 3,320,044 | 5/1967 | Cole et al. | 165/4 X |
| 3,397,738 | 8/1968 | Daunt | 165/10 |
| 3,477,496 | 11/1969 | Becker | 165/10 |

FOREIGN PATENT DOCUMENTS 812491 4/1959 United Kingdom ................. 165/10

Primary Examiner—Albert W. Davis, Jr.
Attorney, Agent, or Firm—Louis Etlinger; Richard I. Seligman

[57] ABSTRACT

A sensibe heat storage unit is provided which has a "step function" thermal gradient, and is constructed so as to have alternated regions of different thermal conductivity along the flow path through the unit such that, in one embodiment, there are spaced elements within the storage unit having transverse conductivities higher than the conductivity of the material in the spaces therebetween. This permits discharge of the storage unit at a uniform temperature until the storage unit is emptied.

5 Claims, 4 Drawing Figures

SENSIBLE HEAT STORAGE UNIT

This is a continuation of application Ser. No. 918,889, filed June 28, 1978, now abandoned.

FIELD OF INVENTION

This invention relates to energy conversion systems and more particularly either to an improved sensible heat storage unit which can be discharged at a uniform temperature.

BACKGROUND OF THE INVENTION

While the subject invention relates to an improved sensible heat storage unit, it has particular utility in solar energy conversion systems, and especially those which use Brayton cycle engines. It is therefore useful to describe the solar energy conversion system for which the subject unit was designed. Although designed for a special type of solar energy conversion system, the subject storage unit may be utilized in any application where constant discharge temperatures are required.

With respect to solar energy conversion systems, while "latent" heat switchable storage units have been utilized in steam cycle solar energy conversion systems as illustrated in U.S. Pat. No. 2,933,855 issued to E. K. Benedek et al., Apr. 26, 1960, the benefits of a "sensible" heat storage system have heretofore not been utilized with a Brayton cycle system involving a gas cycle turbine.

One of the major problems with solar energy conversion systems utilizing steam is, in general, the extremely corrosive nature of superheated steam and the upper temperature limit associated with the tubing or plumbing used. In general, it is possible to heat up solar receivers to temperatures in excess of 2500° F. in situations utilizing a central receiver positioned at the focus of a mirror field which redirects sunlight onto the solar energy receiver. Thus, the capability of central receiver type installations far exceeds the restraints on superheated steam systems which, in general, must operate below 100° F.

It will be appreciated that even the highest quality steels have limited strength at temperatures over 1650° F. and, therefore, new types of solar receivers and storage equipment are necessary if solar energy is to be efficiently converted into electrical energy. It will be appreciated that the higher the temperature of the working fluid or gas, the more efficient will be the conversion process.

In the present illustration an air or Brayton cycle system is used instead of a steam cycle. Brayton cycle engines have the advantages of proven outstanding realibility and efficiencies 10–20% higher than the steam cycle engines. As will be seen, they integrate well with low cost sensible heat storage units, and become optimum at very low pressure ratios, which allows even higher reliabilities and high component efficiencies.

The solar energy conversion system described can withstand the high temperatures associated with central receiver type installations in which the receiver may be of the type that utilizes a ceramic honeycomb heat exchanger and in which sensible heat storage units of refractory materials are used so as to withstand the high temperatures.

In one embodiment, an efficient "split cycle" solar energy system includes a solar energy loop isolated from a Brayton cycle engine (turbine) coupled to an electric generator. In the solar energy receiver loop a switchable sensible heat storage unit is charged by the solar receiver. The charged storage unit is then switched into the Brayton cycle turbine loop where it serves as the prime energy source of the engine. Finally, after it has been discharged, the unit may be utilized as a high temperature, high efficiency recuperator to recover waste heat from Brayton cycle turbine exhaust. The switchable sensible heat storage unit system is alternatively referred to as an "energy shift register" system.

The use of the sensible heat storage unit as a recuperator permits the Brayton cycle engine to be run at extremely low pressure ratios and a thermal/electric conversion efficiency in excess of 60%. This can result in a solar/electric conversion efficiency in excess of 40%, as contrasted with steam cycle solar energy conversion efficients of less than 20%.

In the conventional Brayton cycle, large pressure losses occur in the heat addition cycle because heat is being added to a high velocity fluid stream. Also, penalizing temperature and pressure losses occur in the large recuperator needed to make low pressure ratio engines operate at high thermal efficiencies. In some types of ceramic wheel heat exchangers, there is significant leakage to further penalize performance.

The "energy shift register" system utilizing sensible heat storage improves the efficiency of Brayton engines by minimizing these losses. Heat addition occurs efficiently and slowly without significant pressure loss in a large insulated tank filled in one embodiment with alternated materials of different thermal conductivity which produce low conductivity in the flow direction. In one embodiment the storage unit is formed by spaced ceramic matrices or perforated ceramic elements. As the air passes through the matrices at velocities of 1 m/sec or less, a sharp thermocline (called herein a "step function" thermal gradient) develops; i.e., in a narrow region of the tank a major temperature gradient develops, and travels at approximately 1/1000 of the air velocity. As will be seen, this permits discharge of the tank at a uniform temperature. When the step function thermal gradient reaches either the top or bottom of the tank, the tank is considered full and must be switched out of one position of the Brayton cycle into another. Hence, the name "energy shift register."

As can be seen, the sensible heat storage is utilized to isolate the receiver loop from the engine or electric power generating loop. Thus, the sensible heat storage unit provides a large buffer for the turbine and allows a high degree of flexibility in plant operation by allowing different rates of thermal energy collection and consumption.

In short, the isolation between the receiving loop and the engine loop buffers the engine against changes in solar flux due to the passing of clouds over the sun, etc., or from any receiver-related condition. Thus, the engine loop can be made and designed to run at maximum efficiency regardless of the operating conditions in the receiver loop.

Moreover, because of the isolation between the receiving loop and the engine loop in the subject invention, the solar receiver loop may operate at a different pressure than the engine loop, since the storage unit to be described can be discharged at any desired pressure. Separating the receiver from the pressurized engine loop permits the use of an "open-ended" ambient pressure solar receiver in which a "window" need not be used. The "open-ended" receiver typically operates at ambient pressure to reduce sealing requirements and for safety and low cost. This receiver also uses air which is a non-polluting working fluid. Moreover, when working at atmospheric pressure, the heat exchanger in the receiver may be assembled loosely to its housing to allow room for thermally induced motions.

While a split cycle solar energy conversion system with sensible heat storage has been described in which a Brayton cycle engine is utilized, it will be seen that the subject system involves improvements in the Brayton cycle system itself. The improvements to the Brayton cycle system include the use of a sensible heat storage unit both for recuperation and as a prime energy source.

As a prime energy source, operating the storage unit at low pressure makes it possible to run the Brayton cycle engine at highly efficient low pressure ratios. Moreover, energy for the Brayton cycle engine may be provided not only from the sun, but also from extremely "dirty" fuels. This is because deposits from the fuels are not picked up by the low velocity gaseous working fluid and do not reach the Brayton turbine blades to corrode them.

When the sensible heat storage unit is used as a recuperator, because of its extremely high effectiveness, the entire efficiency of the Brayton cycle system is significantly increased.

SENSIBLE HEAT STORAGE

It should be noted that the storage unit envisioned for use herein is a "sensible" heat storage unit as distinguished from a "latent" heat storage unit. The distinction between sensible heat storage and latent heat storage is that sensible heat is energy stored in the heat capacity of the materials in the storage unit so that every time a BTU of sensible heat is stored, the temperature of the material goes up proportionately. Thus, with every BTU added, the temperature of the material goes up, whereas in latent heat storage, there is a phase change in the material such that for every BTU added there is not necessarily any temperature change, but rather part of the material changes state, e.g., goes from liquid to gas or solid to liquid. In latent heat storage there is no change in temperature until all the material has experienced a phase change. It should be noted that the above-mentioned Benedek et al steam cycle plant utilizes latent heat storage. The major problem with latent heat storage is the corrosive nature of the phase-change materials used. In the Benedek et al. patent sodium salt ($NaNO_3$) which is exceedingly corrosive is used as the phase-change material. Also the temperature is fixed for a given phase change material, which limits the temperature change over which latent heat storage units may operate.

Sensible heat storage has been utilized in the steel industry for over 150 years through the use of what are known as blast furnace stoves. A blast furnace stove is a heat exchange device used since the early 1800's in the glass and steel industries. In general, it consists of an insulated pressure shell containing an internal air duct and a large array of refractory bricks called "checkers." The checkers are arranged in stacks, often 30 meters high, forming a large number of individual air passages called flues, through which the air can flow. Heat is alternately stored in the checkers or removed from them during opposing portions of the process cycle. In the steel industry, these stoves are used to supply vast quantities of hot air into the blast furnaces which are charged with iron ore, coke, and limestone. The hot efflux of the furnace is piped into another "cold" stove where heat is extracted for use during the next blast period.

In a typical installation, a furnace will have three or four stoves manifolded together with automatic valves, with multiple stoves "on blast." The outputs of these stoves are controlled by heat sensors and valving so that the combined output temperature from the manifolded stoves remains constant. It should be noted that the output temperature of these stoves varies with time during the discharge cycle and, therefore, it is necessary to add and subtract heat as necessary depending on the sensed temperature of the air delivered to the blast furnace. Through an arrangement called staggered parallel operation the stoves are valved from one position to another to maintain constant output temperatures during the continuous operation of the furnace.

The ideal operating temperature for current blast furnace stoves is 2000° F. which has now been found to be ideal for efficient gas turbine operation. It has also been found that typical stoves deliver air at the same pressure as that required if the stove were to exhaust into a turbine designed for recuperated operation. Additionally, since blast furnace stoves are designed to handle large flow rates with low internal pressure losses, high Brayton cycle efficiency and thus, high thermal/electric conversion efficiencies can be maintained.

In summary, it has been found that the adaptation of blast furnace stoves to Brayton cycle power plants is unusually efficacious because of the ability to store and release huge quantities of heat at high temperatures; because of the ability to deliver large air flows; because of the ability to operate at the desired pressure levels; and because of the existence of automatic valving techniques to rapidly connect and reconnect stoves.

STEP FUNCTION THERMAL GRADIENT STORAGE

However, one problem with the use of the traditional blast furnace stove is that the outlet temperature drops 400°–500° F. during discharge, an undesirable condition for operating Brayton cycle machinery because it means either a loss in efficiency or that makeup heat must be provided.

As will be seen hereinafter, it is not desirable to manifold and control numerous individual stoves, it is desirable to provide a novel sensible heat storage unit in which the above temperature drops are not experienced. This unit is called a step function thermal gradient storage unit. The term "step function" refers to a sharp temperature discontinuity between a "spent" region of the unit and a "charged" region of the unit. In other words, the temperature discontinuity is confined to a narrow region of the unit, typically a region 1/10 the length of the unit. Because of the "step function" operation, this sensible heat recovery unit is characterized by a constant output temperature at temperatures in excess of 2000° F. and makes possible efficient engine design.

For purposes of this portion of the invention, step function thermal gradient storage units are characterized in that they have an overall anisotropy in that there is a low thermal conductivity in the flow direction as opposed to the lateral direction. In one embodiment, this is accomplished by spacing isotropic ceramic matrices along the flow path within the storage unit. In general, this results in a structure in which the spaced apart matrices or elements have a higher intrinsic as well as overall transverse conductivity than the conductivity of the material in between the elements, while the net longitudinal conductivity is lower than the matrix or the interstitial material due to the alternating "series" arrangement. This results in a battery-like operation of the storage unit, such that until the storage unit is completely discharged, the output temperature of the fluid from the storage unit stays constant. This is because there is a sharp "step function" differential in temperature within the storage unit as energy is withdrawn from or added to the unit. The sharp temperature change takes place in a narrow region of the unit and travels from the inlet end of the storage unit towards the outlet end during the discharge operation. Prior to the step function thermal gradient reaching the output port of the storage unit, energy is taken out of the storage unit at essentially a constant temperature. In essence, therefore, the storage unit can be conceived of as a battery whose output does not vary during the discharge cycle until the battery is completely discharged.

It is, therefore, an object of this invention to provide a step function thermal gradient storage unit for utilization in an energy conversion system.

It is another object of this invention to provide a sensible heat storage unit with preferred anisotropic properties.

These and other objects will be better understood in view of the following detailed description when viewed in light of the accompanying drawings in which:

DETAILED DESCRIPTION

Figure 1:
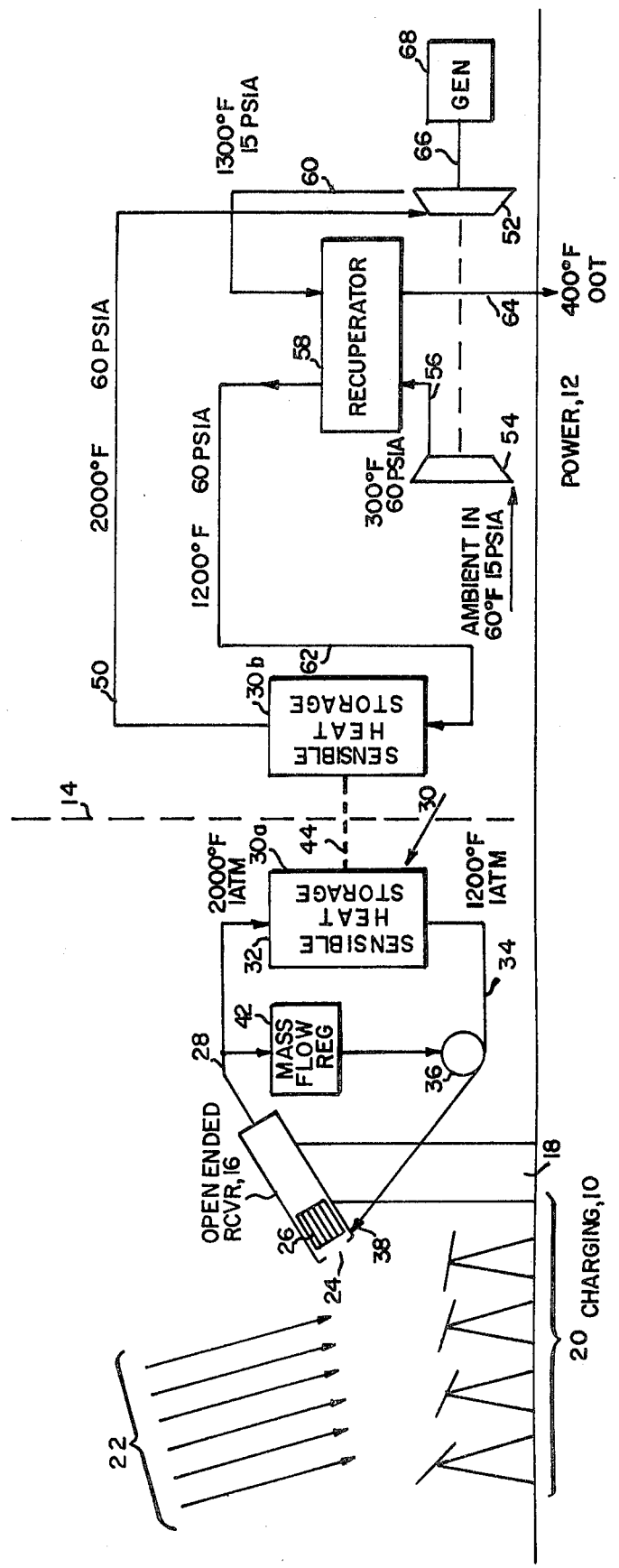
FIG. 1 is a diagrammatic illustration of an isolated loop thermal/electric conversion system in which the charging loop includes an open-ended solar receiver and in which the engine loop includes a Brayton cycle engine.

Referring now to FIG. 1, in one embodiment, the illustrated system includes a charging loop generally designated by reference character 10 and a power loop generally designated by reference character 12, separated by dotted line 14. An open-ended solar receiver 16, in one embodiment, is located in the charging loop and is mounted on a tower 18 which is at the focus of a mirror field generally indicated at 20. Mirror field 20 redirects solar rays 22 through the open-end 24 of the solar receiver and onto a heat exchanger 26 located within the receiver. The heat exchanger may be a ceramic honeycomb matrix made of silicon carbide. In one embodiment, this open-ended receiver operates at atmospheric pressure so that its output over line 28 carries air at 2000° F. and 1 atm. to a sensible heat storage unit 30 at position 30a. The input to the sensible heat storage unit at 30a is designated 32, and its output 34. In one embodiment, prior to being completely filled, the sensible heat storage unit is initialized at 1200° F. Output 34 is connected to a suitable fan or blowing system 36 which exhausts to the front end of the solar receiver as shown by return line 38.

In operation, air is sucked from return line 38 and is heated as it passes through heat exchanger 26 which is heated by the focused solar radiation (called "insolation") from the mirror field. With proper pressure adjustments, the pressure drop across the open end 24 of the receiver can be reduced to zero thereby eliminating the need for a window. The hot air downstream of the heat exchanger is coupled to the inlet of the sensible heat storage which initially is at 1200° F.

The sensible heat storage unit at 30a is charged to capacity by the incoming hot air such that at some time after the charging has begun, the entire sensible heat storage unit is at 2000° F. The flow through the sensible heat storage unit is adjusted by a mass flow regulator 42 which adjusts the mass flow of blowing system 36 in accordance with the sensed temperature so as to maintain the receiver outlet air temperature at 2000° F.

When the sensible heat storage unit at 30a is charged to capacity, it is shifted by conventional valving techniques from its position shown to the left of dotted line 14 to the position 30b to the right of dotted line 14 as illustrated by arrow 44. In the position illustrated by 30b, the sensible heat storage unit acts as a prime source of energy for the power loop.

In the illustrated case, the sensible heat storage unit at position 30b, is discharged at 60 psia and at a temperature of 2000° F. over line 50 to the turbine section 52 of a Brayton cycle engine. The engine includes a compressor 54 which compresses ambient air at 60° F. and 15 psia to raise the temperature of the incoming air to 300° F. and to raise the pressure to 60 psia. The output of the compressor at 56 is connected to a conventional recuperator 58. At this point, the 300° F. air from the compressor section captures waste heat from the output of turbine section 52 via line 60 which is coupled to recuperator 58. This line carries air at 15 psia at 1300° F. In the process, the temperature of the air from the compression section goes from 300° F. to 1200° F. and is delivered over line 62 to the input end of the sensible heat storage unit at position 30b. When the unit at 30b is discharged from 2000° F. to 1200° F., it is switched back to position 30a for recharging.

It should be noted that the output 64 of the recuperator corresponding to input line 60 exhausts air to the atmosphere at approximately 400° F.

As shown, the mechanical turbine output is illustrated by dotted line 66 and is coupled to a conventional electric generator 68.

The advantage provided by the system of FIG. 1 is the ability to separate the solar collection cycle from the turbine cycle of using highly efficient sensible heat storage. Operationally, this offers the user the advantage of scheduling power outputs to meet demand without direct dependence upon instantaneous availability of focused sunlight. As mentioned hereinbefore, sensible heat storage in the form of checker stoves may, if properly manifolded, be utilized. Single sensible heat storage units may also be used, especially if modified for step function thermal gradient operation.

In the illustrated system, all energy passes through a storage unit. This provides a large buffer for the turbine as the only storage losses are those associated with insulation losses through the storage unit wall and losses involved in pressure/switching of the sensible heat storage units. These sensible heat storage units also provide a high degree of flexibility in the plant operation by allowing different rates of thermal energy collection and consumption.

By the ability to isolate the charging loop from the power loop, it is now possible to utilize a solar receiver which differs from conventional configurations in that it does not utilize a standard high pressure tube/boiler technique. The open-ended solar receiver captures and transfers heat at pressures near atmospheric, utilizing a material and a configuration that is a highly efficient absorber of solar radiation. The aforementioned honeycomb heat exchanger operates with a very low pressure drop (less than 1 inch H₂O) thus reducing the air sealing requirements and permitting the honeycomb components of the heat exchanger to be assembled loosely to allow room for thermally-induced motions. Since the entire receiver operates at near atmospheric pressure, safety hazards and the cost of the pressure vessel are minimized.

In passing, the open cycle Brayton concept has several important advantages. The basic gas turbine cycle is simply implemented compared to steam cycles. The reduced maintenance associated with gas turbines is enhanced by the reduction of the corrosion problems due to fuel combustion products. In addition, the energy efficient, open-cycle air system permits direct rejection of residual (waste) heat to the atmosphere, eliminating the need for large quantities of cooling water.

Moreover, the engine can be mounted at the concentrator focus and closely coupled to the solar receiver. As will be seen, when the recuperator is in the form of a sensible heat storage unit, it is lightweight and can also be mounted with the receiver/engine unit, providing an integrated thermal conversion system with short piping and low thermal losses.

In summary, because of the use of the split cycle, an open-ended receiver can be used which uses air as the working fluid. Moreover, heat collection and power generation is accomplished in separate, independent heat transfer loops. Additionally, since the power generation system works from storage, it is independent of short term fluctuations and solar radiation. Finally, the use of sensible heat storage units for storage significantly increases system efficiency because it actually fulfills a recuperator/heat exchanger function as well as storage/delay.

In the system illustrated, either one or two storage units are used which are sequentially valved into one of the two positions shown. In another type system, a third and even a fourth unit may be used for additional storage and recuperation.

STEP FUNCTION THERMAL GRADIENT STORAGE UNIT

As will be seen, it is desirable for the storage unit to have what is known as a "step function thermal gradient" in which the temperature difference between two adjacent locations is very shape. This means that the transition between one temperature and another temperature within the storage unit occurs in a transition zone of less than 1/10 the total flow path length of the unit. This is accomplished in one embodiment by providing high density, high heat capacity, high conductivity matrices at spaced locations along the flow path such that, in general, the thermal conductivity in the direction of flow is mimimized.

As outlined in an article by D. J. Close entitled, *Rock Pile Thermal Storage for Comfort Air Conditioning*, Instrumentation Engineering Australia (Mechanics & Chemical Engineering Transcripts), Vol. MC.1 (#1), at page 14, the works of Schumann (*Heat Transfer: A Liquid Flowing Through a Porous Prism*, J. Franklin Inst., Vol. 208, September, 1929, pp. 405–16) and Furnas (*Heat Transfer from a Gas Stream to a Bed of Broken Solids*, Amer. Inst. Chem. Engrs. Transcripts, Vol. 24, June, 1930, pp. 142–69) on packed beds indicate that there is an assumption that the bed has zero conductivity in the flow direction and infinite conductivity in planes normal to it. However, Close, later on in his article, indicates that these assumptions for the rock pile thermal storage are incorrect because so little is known about the actual operation of rock piles when used as thermal storage. On page 17 of the Close article Close says that certain factors suggest that the simple theory is inadequate and that it would be instructive to examine the validity of the main assumption of zero conductivity of the packing in the flow direction and infinite conductivity perpendicular to it. Thus, according to Close, the assumptions by Schumann and Furnas are all subject to scrutiny and extensive testing.

On the other hand, a computer program and algorithm have now been developed which evaluate all of the types of energy transfer within the rock pile on a point-by-point basis. It has been found that, indeed, as Close suspected, there is not infinite conductivity in planes normal to the flow path, nor is there zero conductivity in the flow direction.

In the subject invention these anisotropic characteristics can be made to occur within the sensible heat storage unit by specialized structure within the unit, and that having done so, the transition zone for the thermal gradient can be kept small, of the order of 1/10 the overall flow path length. This provides a step function thermal gradient which permits the storage unit to discharge at a substantially constant temperature until the gradient travels from the inlet end of the storage unit completely to the outlet end.

In other words, there is a large thermal gradient between the "charged" portion of the storage unit and the "spent" or uncharged portion of the unit. Because the gradient travels from the inlet to the outlet end at a relatively low speed, and because the transition is kept to a small area, the discharge temperature of the unit is maintained substantially constant throughout the discharge cycle. This type of operation is not possible with uniform packed beds operating at the temperatures and pressures specified in the above-mentioned articles. What is therefore necessary is to modify the packed bed structure to give it an anisotropic property of low thermal conductivity in the flow direction and higher thermal conductivity lateral to the flow direction.

This anisotropic property results in the step function thermal gradient and is made to occur in the subject invention by the alternation or lamination of materials of different thermal conductivity along the flow path in the storage unit, or by the use of anisotropic materials in the storage unit.

In order to produce a step function thermal gradient, it is desirable to reduce transverse gradients while maximizing gradients in the flow direction, with the sharpeness of the thermocline being dependent upon low conductivity in the flow direction. Therefore, it is a characteristic of the subject storage unit that high conductivity in the flow direction is materially reduced, thereby to provide a step function thermal gradient.

It is possible to produce this step function thermal gradient by using laminated structure made up of isotropic materials. Thus, it is a finding of this invention that isotropic elements may be used to achieve a step function thermal gradient of the type described, while helping uniformity of heat transfer in the transverse direction.

It is also a finding of this invention that the step function thermal gradient can be achieved by providing spaced regions having a conductivity transverse to the flow path which is higher than the conductivity of the material along the flow path in the spaces inbetween these regions.

It will be appreciated that the anisotropy in the above-mentioned embodiment is due to the laminated configuration of the storage unit, as opposed to any anisotropic property in the materials used. It will, however, be appreciated that anisotropic materials could be used in place of the laminated structure. These anisotropic materials exist and in general, are single crystal solids. However, single crystal solids are usually too expensive for use in the subject system.

Figures 2A, 2B:
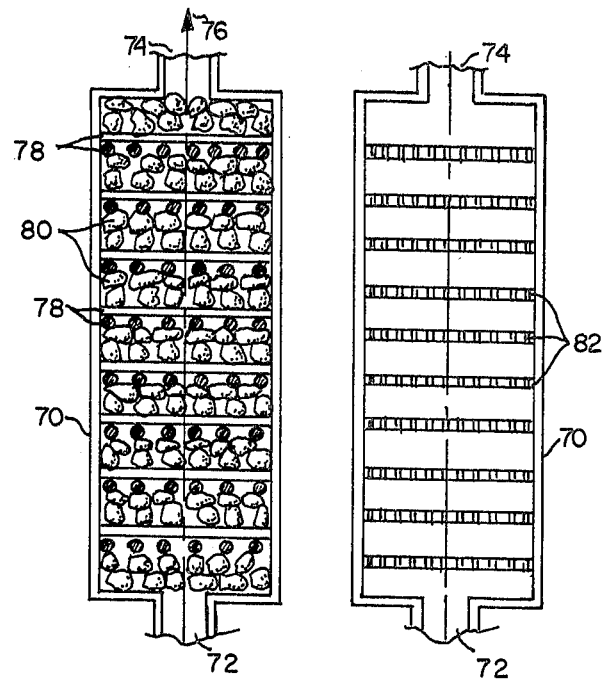
FIGS. 2A and 2B diagrammatically illustrate in cross-section step function thermal gradient storage units which may be utilized as the sensible heat storage units illustrated in FIG. 1.

Referring to FIGS. 2A and 2B, there are shown two different types of sensible heat storage units in which a step function thermal gradient can be achieved.

With respect to FIG. 2A, the unit may have a housing 70 having an inlet 72 and an outlet 74 in which the flow direction and path is indicated by dotted arrow 76. This unit is packed with spaced apart isotropic structures 78 which may be rods or matrices of metal or materials such as mullite or cordierite. It will be appreciated that these structures are spaced apart along a flow path indicated by arrow 76. In between these structures are regions 80 which may be filled with material having a lower thermal conductivity in the flow direction, such as clay refractories which have a conductivity of 0.1 BTU/Hr./sq. ft.

As shown in FIG. 2B, unit 70, may carry segments 82 which may be honeycomb discs or perforated blocks of mullite or cordierite to provide for the higher thermal conductivity in the transverse direction than the spaces therebetween. The low thermal conductivity areas 84 are merely provided by spaces occupied by air or other gases passing through the unit. A property of the above-mentioned materials is also that they retain heat. Thus, alternatively, what is provided are spaced segments of high heat retaining material.

Alternatively, any higher thermal conductivity segment transverse to the flow path may be utilized, such as corrugated materials interspaced with flat materials of the same material structure (not shown). Transverse metal plates may be used now and then to get maximum net anisotropy if needed.

The important aspect of the unit is that in order to achieve the step function thermal gradient, there are regions spaced apart and transverse to the flow path which have higher thermal conductivity than that of the spaces in between these regions.

Figure 3:
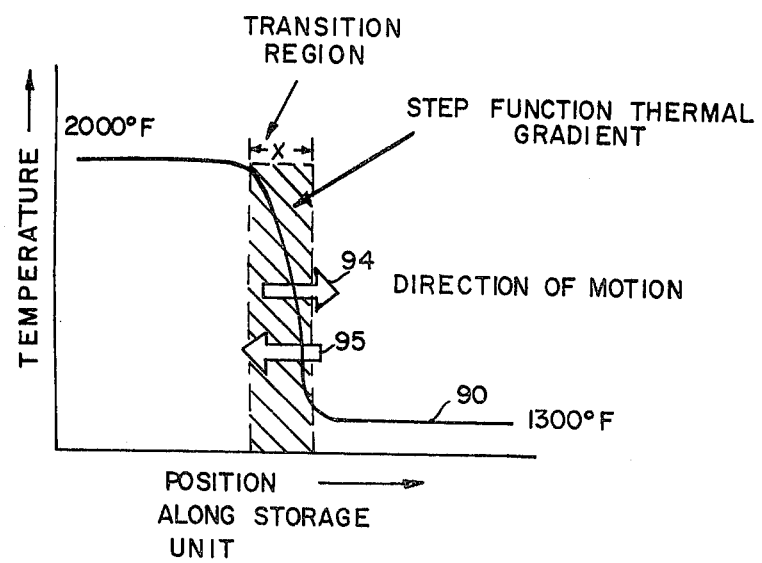
FIG. 3 is a graph illustrating the "step function" characteristic of the step function thermal gradient storage units of FIG. 2, showing the direction and motion of the thermal gradient during either the charging or discharging cycle.

Referring to FIG. 3, a graph is shown of the step function thermal gradient. This step function thermal gradient is shown by solid line 90 for the charging or discharging case. During charging, the step function thermal gradient moves from the left to the right, from the inlet end of the thermal storage unit to the outlet end as indicated by arrow 94. During discharge, the step function moves in the reverse direction as indicated by arrow 95. The transition region which carries the step function thermal gradient has a length in the flow direction indicated by x. As indicated hereinbefore, a step function thermal gradient is, in essence, defined by the fact that the transition region between one temperature and another in the storage unit occupies a distance along the flow path of less than some small fraction of the total flow path distance between the inlet to the storage unit and the outlet. Thus, in one embodiment in the charging cycle the temperature in the storage unit goes from 1300° F. to 2000° F. over a distance of x which is less than 1/10 the total flow path length through the unit.

While fraction 1/10 is utilized, for explanation purposes, it should be appreciated that the step function may vary substantially. It is distinguished from a gradual thermocline in that there is a narrow transition region which is well defined within the storage unit where the thermal gradient occurs. Portions of the storage unit to either side of the transition region therefore exist at a substantially uniform temperature.

It will be noted that due to the symmetry of the step function thermal gradient storage units, these may be charged and discharged in any direction. As such, they are said to be "bi-directional."

Alternatively, the thickness and thermal conductivity of the materials utilized within the unit may be given asymmetric properties such that they are no longer bi-directional. In this case, it might be useful to make the transition portions at the outlet end of greater thickeness than those at the inlet end.

Although preferred embodiments of the invention have been described in considerable detail for illustrative purposes, many modifications will occur to those skilled in the art. It is, therefore, desired that the protection afforded by Letters Patent be limited only by the true scope of the appended claims.

I claim:

1. A step function thermal gradient sensible heat storage unit comprising:
   a housing having an inlet and an outlet and a flow path therethrough from said inlet to said outlet;
   a first plurality of structures permitting fluid flow therethrough disposed within said housing, said structures being spaced apart along substantially the entire length of said flow path;
   a second plurality of structures permitting fluid flow therethrough disposed within said housing in between said first plurality of structures, said second plurality of structures providing the principal heat storage medium for the unit;
   said first plurality of structures providing a substantially straight-line shunt between the sides of said housing and thereby yielding a substantially higher net thermal conduction transverse to said flow path throughout substantially the entire housing than the thermal conductivity of said second plurality of structures such that a step function thermal gradient is provided which permits discharge of the storage unit at a substantially constant output temperature.

2. The unit of claim 1 wherein said first plurality of structures comprise a metal.

3. The unit of claim 1 wherein said second plurality of structures comprise refractories.

4. The unit of claim 1, further including a medium interspersed among said first and second plurality of structures having a thermal conductivity lower than that of said first and second plurality of structures.

5. The unit of claim 4 wherein said medium is air.

* * * * *